US008577953B2

(12) United States Patent
Roche et al.

(10) Patent No.: US 8,577,953 B2
(45) Date of Patent: Nov. 5, 2013

(54) SYSTEM AND METHOD FOR PROVIDING MULTIMEDIA SERVICES

(75) Inventors: Mark Roche, Austin, TX (US); Lalitha Suryanarayana, Austin, TX (US); Sreenivasa Gorti, Austin, TX (US); Philip C. Cunetto, Austin, TX (US); J. Bradley Bridges, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1024 days.

(21) Appl. No.: 11/301,294

(22) Filed: Dec. 9, 2005

(65) Prior Publication Data

US 2007/0136459 A1 Jun. 14, 2007

(51) Int. Cl.
*G06F 15/16* (2006.01)
*G06F 21/00* (2013.01)
*G06F 3/00* (2006.01)
*H04L 29/06* (2006.01)
*H04N 7/173* (2011.01)
*H04N 7/10* (2006.01)

(52) U.S. Cl.
USPC ........... 709/201; 709/204; 709/206; 709/217; 709/227; 709/229; 709/230; 709/232; 713/153; 713/182; 725/110; 725/113; 725/139; 725/34; 725/43; 725/46; 725/61; 725/62; 725/73; 725/80

(58) Field of Classification Search
None
See application file for complete search history.

(56) References Cited

U.S. PATENT DOCUMENTS

| | | | | |
|---|---|---|---|---|
| 5,903,816 A | * | 5/1999 | Broadwin et al. | 725/110 |
| 5,946,375 A | * | 8/1999 | Pattison et al. | 379/112.01 |
| 6,144,375 A | * | 11/2000 | Jain et al. | 715/251 |
| 6,697,869 B1 | * | 2/2004 | Mallart et al. | 709/231 |
| 6,832,388 B1 | * | 12/2004 | Du Val | 725/110 |
| 6,941,574 B1 | * | 9/2005 | Broadwin et al. | 725/37 |
| 2002/0021689 A1 | | 2/2002 | Robbins et al. | |
| 2002/0040477 A1 | * | 4/2002 | Baese et al. | 725/73 |
| 2002/0091723 A1 | * | 7/2002 | Traner et al. | 707/205 |
| 2002/0147008 A1 | | 10/2002 | Kallio | |
| 2003/0056220 A1 | * | 3/2003 | Thornton et al. | 725/62 |
| 2003/0194968 A1 | * | 10/2003 | Young | 455/45 |
| 2003/0208545 A1 | * | 11/2003 | Eaton et al. | 709/206 |
| 2003/0220091 A1 | * | 11/2003 | Farrand et al. | 455/404.1 |
| 2003/0235176 A1 | | 12/2003 | Zhang et al. | |
| 2004/0128394 A1 | * | 7/2004 | Knauerhase et al. | 709/229 |
| 2004/0199649 A1 | | 10/2004 | Tarnanen et al. | |
| 2005/0018637 A1 | | 1/2005 | Karoubalis et al. | |
| 2005/0060641 A1 | * | 3/2005 | Sezan et al. | 715/500.1 |
| 2005/0120379 A1 | * | 6/2005 | Van Agt et al. | 725/100 |
| 2005/0159653 A1 | * | 7/2005 | Iijima et al. | 600/300 |
| 2005/0164691 A1 | | 7/2005 | Payne | |
| 2005/0210527 A1 | * | 9/2005 | Hisamatsu et al. | 725/113 |
| 2005/0278425 A1 | * | 12/2005 | Wilsher et al. | 709/204 |
| 2006/0064599 A1 | * | 3/2006 | Yoshida | 713/182 |

(Continued)

*Primary Examiner* — Ario Etienne
*Assistant Examiner* — Ho Shiu
(74) *Attorney, Agent, or Firm* — Guntin & Gust, PLC; Ralph Trementozzi

(57) ABSTRACT

A system and method are disclosed for session continuity in multimedia services. A system that incorporates teachings of the present disclosure may include, for example, a multimedia services system has a plurality of service centers each capable of offering one or more multimedia services to an end user, and a controller for managing operations of the service centers. The controller can be programmed to monitor the end user's use of multimedia services from said service centers, detect a change in use by the end user, and offer the end user a multimedia service adapted to the change in use.

22 Claims, 3 Drawing Sheets

(56) References Cited

U.S. PATENT DOCUMENTS

| | | | |
|---|---|---|---|
| 2006/0089199 A1* | 4/2006 | Jordan et al. | 463/42 |
| 2006/0184972 A1* | 8/2006 | Rafey et al. | 725/80 |
| 2006/0190559 A1* | 8/2006 | Lim | 709/217 |
| 2006/0195866 A1* | 8/2006 | Thukral | 725/34 |
| 2007/0094490 A1* | 4/2007 | Lohr | 713/153 |
| 2007/0116013 A1* | 5/2007 | Brown et al. | 370/395.53 |
| 2007/0118656 A1* | 5/2007 | Anderson et al. | 709/227 |
| 2010/0283630 A1* | 11/2010 | Alonso | 340/870.11 |

* cited by examiner

SYSTEM AND METHOD FOR PROVIDING MULTIMEDIA SERVICES

FIELD OF THE DISCLOSURE

The present disclosure relates generally to multimedia services, and more specifically to session continuity in multimedia services.

BACKGROUND

The consumer urge for ubiquitous multimedia services such as two-way communications, broadband video services, and gaming—among others—has driven the business model of service providers towards a convergence model. Inevitably consumers desire to subscribe to multimedia services from a single service provider as opposed to today's environment of many providers each offering disparate services that lack interoperability. As convergence becomes a reality, a seamless transition of multimedia services across a number of media devices is desirable.

DETAILED DESCRIPTION

Embodiments in accordance with the present disclosure provide a method for acquiring services on a multiplicity of devices.

In a first embodiment of the present disclosure, a multimedia services system (MSS) has a plurality of service centers each capable of offering one or more multimedia services to an end user, and a controller for managing operations of the service centers. The controller can be programmed to monitor the end user's use of multimedia services from said service centers, detect a change in use by the end user, and offer the end user a multimedia service adapted to the change in use.

In a second embodiment of the present disclosure, a computer-readable storage medium has computer instructions for monitoring the end user's use of one or more multimedia services offered by a plurality of service centers, detecting a change in use by the end user, selecting a multimedia service from a select one of the service centers adapted to the change in use, and causing the service centers to offer a media device of the end user the adapted multimedia service.

In a third embodiment of the present disclosure, a method has the steps of monitoring use of one or more multimedia services presented at one or more media devices selectable by the end user, and offering at a select one of the media devices a select one of the multimedia services adapted to a detected change in use by the end user.

Figure 1:
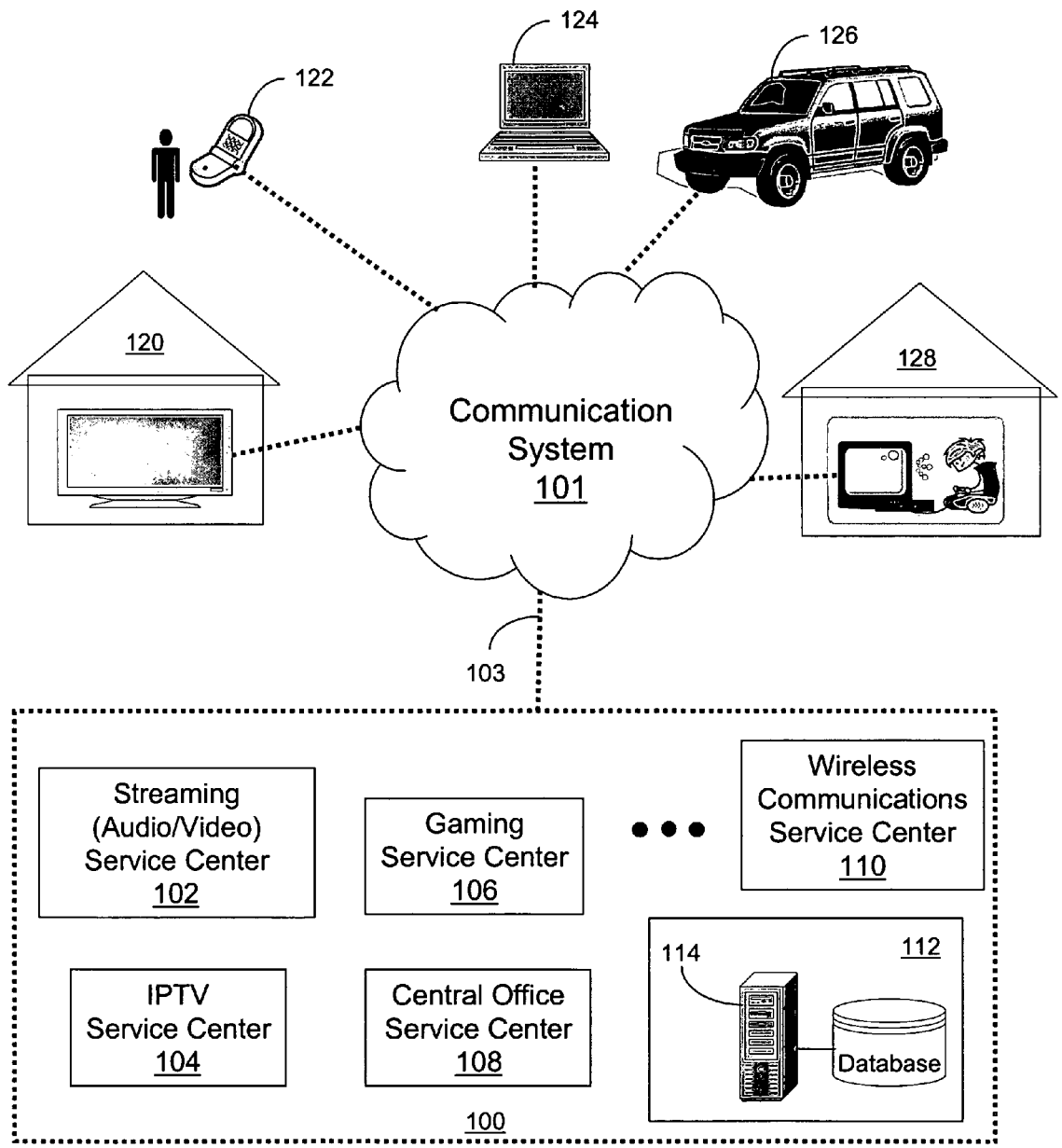
FIG. 1 is a block diagram of multimedia services system (MSS) according to teachings of the present disclosure.

FIG. 1 is a block diagram of multimedia services system (MSS) 100 according to teachings of the present disclosure. The MSS 100 comprises one or more service centers such as a streaming audio and video service center 102, an Internet Protocol Television (IPTV) service center 104, a gaming service center 106, a central office service center 108, and a wireless communications service center 110, just to mention a few. Each of the service centers is coupled by landline (or wireless) communication means to a controller 112 that manages said systems.

The controller 112 can be a scalable server with one or more databases managed by applications such as a customer relationship management (CRM) system and/or an activity-based tracking system that can, for example, monitor consumer and/or service center use behaviors. Although the service centers 102-110 are shown separately, it would be apparent to one of ordinary skill in the art that portions of the service centers can be integrated with each other and the controller 112.

Beginning with the streaming audio and video service center 102, said center can utilize common streaming technology for supplying services such as streaming television programming, streaming radio service, streaming video on demand, and so on. The IPTV service center 104 can supply consumers a higher quality service such as broadband high definition television (HDTV). The gaming service center 106 can provide consumers game services similar to those available for GameBoy™, GameCube™, PlayStation®, and other gaming applications.

The central office service center 108 provides common landline services such as POTS (Plain Old Telephone Services), cable services, and/or broadband services such as xDSL (Digital Subscriber Line). The wireless communications service center 110 provides common wireless services such as cellular communications, dispatch services, WiFi, or WiMax.

There are many media devices available to an end user for interacting with the aforementioned service centers 102-110—some of which are illustrated by way of example in FIG. 1. For example, the end user can have a digital and/or analog television set 120 residing in a residence with integrated functions such as those found in a set top box. Alternatively, the end user can utilize a portable media device such as a cell phone 122 (or multimode device) capable of voice and high-speed data communications. In yet another embodiment, an end user can utilize a laptop or desktop computer 124 capable of processing multimedia services such as streaming video and audio. An end user's automobile 126 can include telematics services which collectively can support vehicle tracking and positioning, on-line vehicle navigation and information systems with emergency assistance, and/or broadband entertainment services such as movies, network TV programming, and/or games on demand. Likewise, the end user can utilize a common gaming media device 128 for playing 2D and 3D interactive games downloaded from or operating at the gaming service center 106 with multiple players competing at single or remote sites.

The aforementioned media devices 120-126 can be connected to the MSS 100 by way of a wired and/or wireless communication link 103 to a communication system 101. The communication system 101 can utilize circuit-switched or packet-switched network technology, or combinations thereof. As a hybrid system the communication system 101 can support disparate communication technologies such as cellular (or any generation thereof), WiFi, WiMax, landline, or optical communications.

Each of the foregoing service centers 102-110 can thus provide by way of the communication system 101 interactive two-way communications, or passive services that terminate at any of the media devices 120-126 available to the end user.

Figure 2:
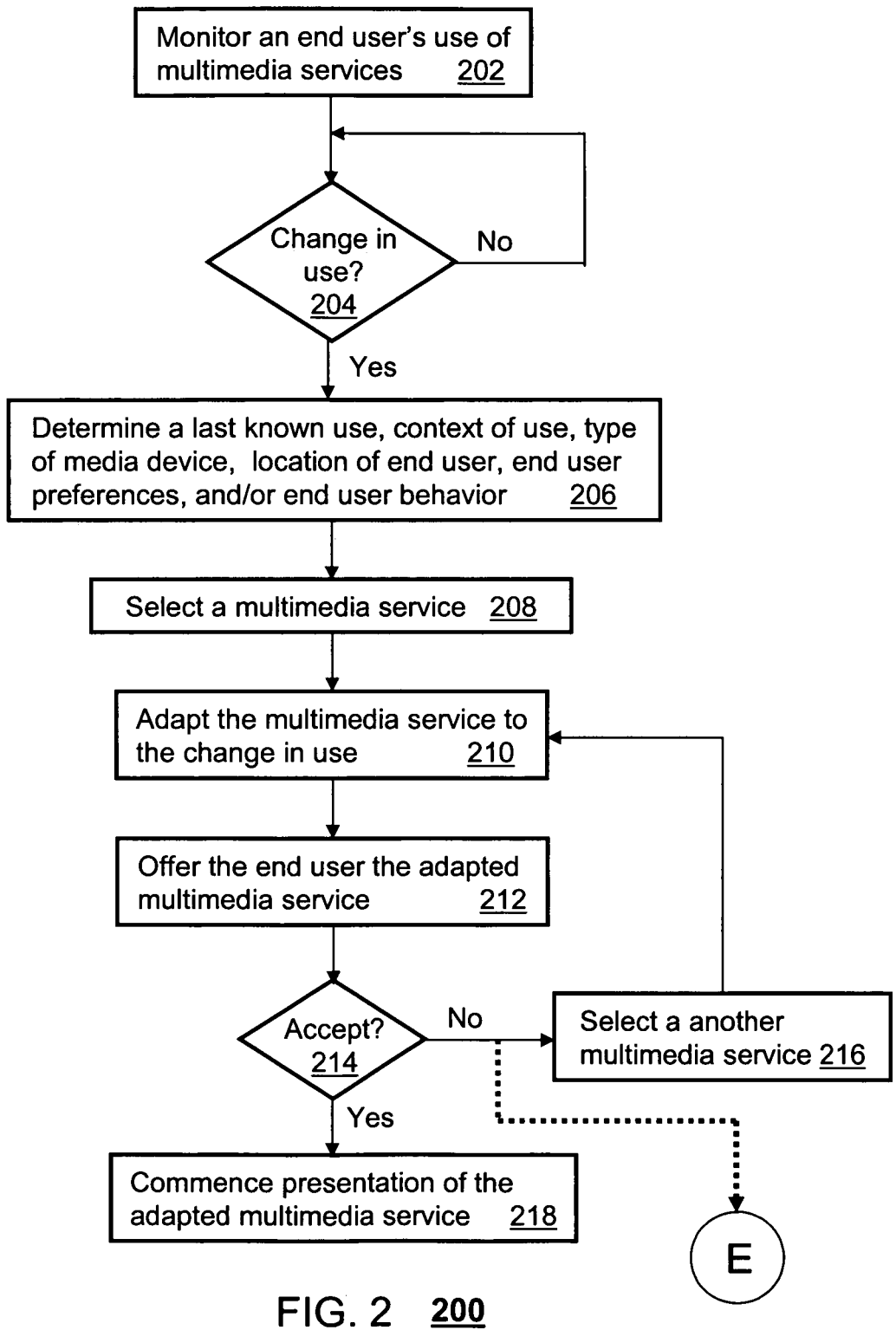
FIG. 2 depicts a flowchart of a method operating in the MSS according to teachings of the present disclosure.

FIG. 2 depicts a flowchart of a method 200 operating in the MSS 100 according to teachings of the present disclosure. Method 200 begins with step 202 where the controller 112 is programmed to monitor a consumer's use of multimedia services on any of the aforementioned media devices 120-126. In this step the controller 112 can monitor any number of activities of the consumer such as, for example, the type of media service in use, the type of media device used for intercepting the multimedia service, the programming selected, a play position of the program while in use, the location of the consumer, and so on. Any number of these metrics can be used by the controller 112 in step 206 to assess the interaction between the end user of the media devices 120-128 and the service centers 102-110.

If a change in use is detected in step 204 (such as, for example, the end user switching from viewing a program on a television 120 to operating a laptop computer 124), the controller 112 proceeds to step 206; otherwise, it continues monitoring for a change in use in step 204. If a change in use is detected, the controller 112 determines in step 206 among other things a last known use of the multimedia service by the end user, a context of use of said service, a type of media device in use by the end user after the switch, a present location of the end user, multimedia preferences established by the end user, and/or an expected multimedia service preference determined according to a predictable prior use behavior.

The last known use of the multimedia service can be represented by a snapshot in time when the end user switched media devices (e.g., an elapse of 10 minutes from the time the end user began viewing an ESPN sports event and the time the end user switched to the laptop computer 124). The context of use in the present example would be sports viewing. The present location of the end user can be detected at the end user's residence if, for example, the laptop computer 124 is connected to Internet service at his or her residence.

The multimedia preferences of the end user can be vast and flexible, and can be established by way of a website provided to the end user for provisioning the MSS 100. For example, the end user can provision the MSS 100 to automatically offer the end user session continuity for sports events, movies, but not for programming such as news or public programs from national stations. The user can also provision the MSS 100 to perform session continuity between certain multimedia devices but not others. For example, the end user can choose certain 3-D games played on the gaming media 128 not to be adapted for a cell phone 122. The scope of programmable preferences that can be offered to the end user for provisioning the MSS 100 can be innumerable considering the expansive variety of media devices available today and in the future.

Continuing with the present illustration, the controller 112 can determine that the laptop computer 124 has a smaller screen than the television unit 120 thus requiring an adaptation of video and audio rendering. The controller 112 can also determine that the laptop computer 124 may not be able to process the same video and audio signals as provided to the television unit 120, in which case streaming services may be more appropriate. Accordingly, in step 208 the controller 112 can switch services from the IPTV service center 104 to the streaming service center 102. This illustrates an example of session continuity between service centers 104 and 102, respectively.

In step 210, the controller 112 can adapt the multimedia service to match the laptop computer 124 resources. That is, the controller 112 can select a streaming service that is within the processing means available to the laptop computer 124. In step 212, the controller 112 can optimize the user experience by offering the end user continued programming from the point at which programming was terminated (e.g., 10 minutes into the sports event). The offer can be made by, for example, an email, an automatic pop-up screen invoked upon logging into the laptop 124, or any other means of notification available in a computing device.

If the end user in step 214 accepts the offer (by an email response or a button depression on the pop-up screen), the controller 112 proceeds to step 218 where the streaming media center 102 commences presentation of the adapted multimedia service (the ESPN sports event) on the laptop's browser, Window Media Player, or other similar application, from where the end user ended program viewing with the television unit 120. If, on the other hand, the end user does not accept the offered service, the controller 112 can be programmed to make another attempt at selecting a different multimedia service in step 216. In this step, the controller 112 can analyze the history of multimedia services selected by the end user by way of, for example, heuristic techniques to predict a suitable alternative.

For example, on prior occasions the controller 112 may find that the end user transitioned to the laptop computer 124 to view emails, or to perform other tasks that would prevent viewing a video program. Nonetheless, in those occasions the end user may have notified the controller 112 of an interest to listen to the audio portion of a particular program. From this history, the controller 112 can predict in step 210 that removing the video portion from the sports program may offer an alternative to the end user in step 212 that matches her interest.

If this second offer is accepted by the end user in step 214, the controller 112 in step 218 commences presentation of the adapted multimedia service based on streaming audio initiated 10 minutes into the program. If the end user rejects the second offer another time, the controller 112 can be programmed to offer the end user a multiplicity of options in step 212. At this point the end user can customize what she wants to view or listen to, or simply end the controller's 112 attempt to provide session continuity (as shown by the dashed line).

From the above discussions, it would be evident to an artisan with ordinary skill in the art that there are a substantial number of embodiments that can be applied to the present disclosure, which for obvious reasons are not described here. For instance, the controller 112 can detect a transition from the television unit 120 to the telematics system in the automobile 126. In this alternate embodiment, the ESPN program can be streamed to the video system of the automobile for the passengers, while the audio portion can be played by the radio system. Similarly, method 200 can be applied in a gaming context in which the end user transitions from, for example, the gaming media device 128 to any number of other media devices such as her cell phone 122, her laptop 124, her television set 120, or the telematics video system of her automobile 126.

In another embodiment, the end user can be in the midst of a voice over IP (VoIP) session with a third party by way of a landline managed by the central office service center 108, and decide to transition to her cellular phone 122. To maintain session continuity with the third party, the end user can, for example, depress one or more buttons (e.g., DTMF tones) on her landline VoIP media device indicating to the controller 112 in step 204 her interest to maintain the session while transitioning between media devices. In this use case, the controller 112 can be programmed to detect when the end user has transitioned to the cell phone 122 by its registration with service center 110. In response to detecting the cell phone 122, the controller 112 can reinstate a continuation of the voice service by causing service center 110 to initiates calls to both the end user and the third party. The call can be a circuit-switched call, or a VoIP call over a data channel of service center 110.

In a similar example, the end user can be in the midst of a communication session on her cell phone 122, enter an elevator or a building with poor coverage causing the session to accidentally terminate. The controller 112 can detect the dropped call from information provided by the service center 110. If the service center 110 has other wireless coverage means in the building such as, for example, WiFi, and the cellular phone 122 is a multimode device capable of accessing WiFi services, then the controller 112 can reinstate the voice service by causing service center 110 to initiates calls to both the end user by WiFi communications, and the third party on whatever network s/he may be on. The call in this instance can be a VoIP call.

The foregoing embodiments illustrate a method where multimedia services follow the end user between media devices. These services may not be the same as the service experienced by the end user prior to the transition (e.g., IPTV to streaming services, VoIP service to a circuit-switched call, etc.). In less complex use cases, a session follows the end user between media devices without a change in service centers (e.g., transferring from one television unit to another sourced by the same IPTV service center 104).

In other embodiments, the controller 112 can provide multimedia session continuity combined with other services. For example, in the case where the end user transitions from a television 120 to his laptop computer 124, the controller 112 can be programmed to activate streaming music from a preferred radio station, and provide a graphical depiction of the sports event that shows the positions of the players with scoring without an audio rendition. This use case can be driven by the preferences established by the end user as described earlier. This example illustrates the adaptation of a multimedia session between media devices along with the introduction of one or more new services based on the multimedia preferences established by the end user among the media devices available to him.

It should further noted that some of the functions of the controller 112 described above can be embodied in part in an IP Multimedia Subsystem (IMS). An IMS is an open standard Next Generation Networking (NGN) multimedia architecture for mobile and fixed IP services. It's based on a 3GPP variant of SIP (Signaling Internet Protocol) that runs over the standard Internet protocol (IP). It can be used by telecom operators in NGN networks (which combine voice and data in a single packet switched network), to offer network controlled multimedia services.

From these illustrations, it would be evident to an artisan with ordinary skill in the art that there a large number of use cases that can be detected by the MSS 100, and from which the MSS 100 can be programmed to provide end users session and/or service continuity between media devices 120-126. These embodiments, although not all described here, are within the scope and spirit of the claims described below.

Figure 3:
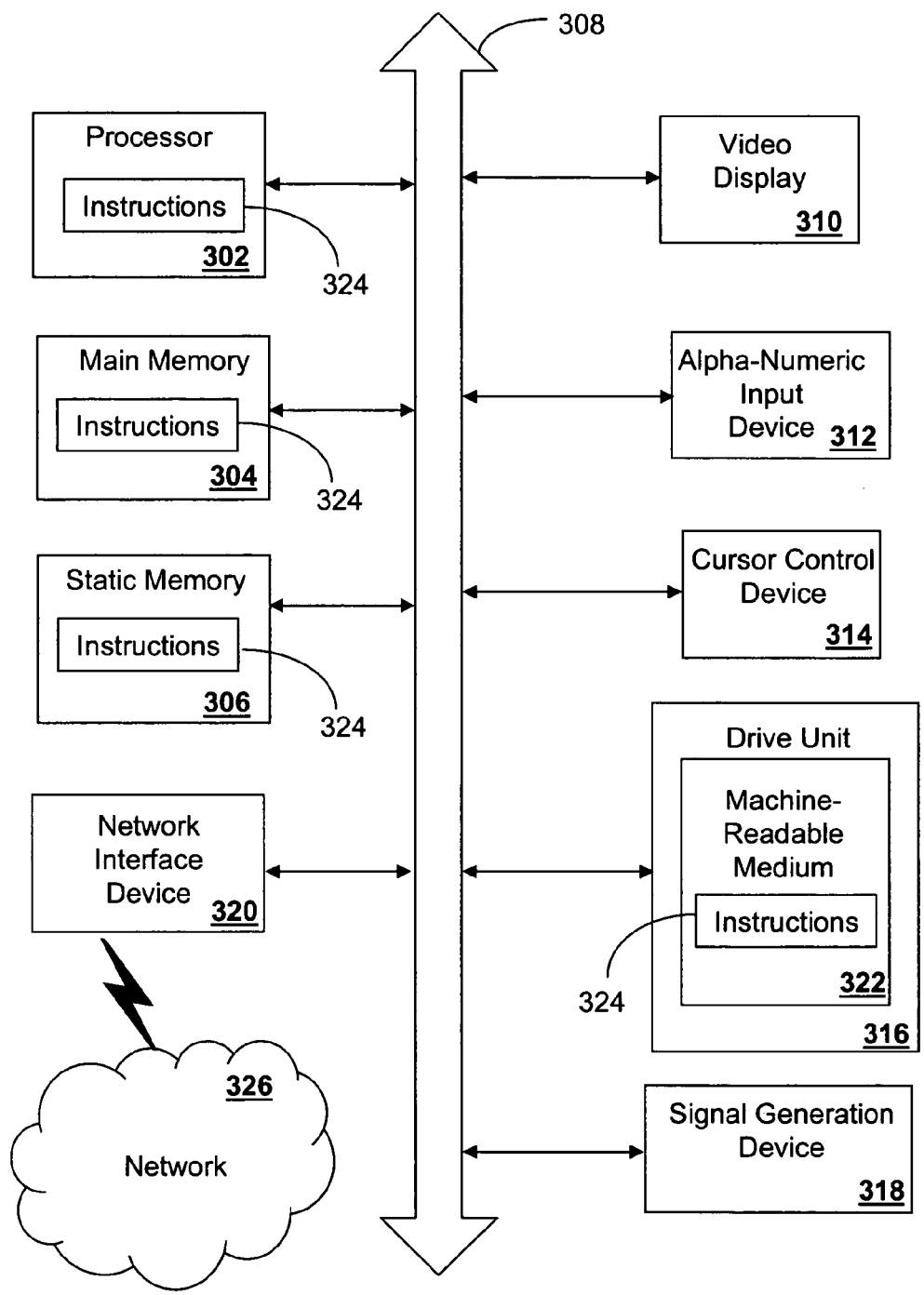
FIG. 3 is a diagrammatic representation of a machine in the form of a computer system within which a set of instructions, when executed, may cause the machine to perform any one or more of the methodologies discussed herein.

FIG. 3 is a diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A multimedia services system, comprising:
   a plurality of service centers each offering a respective one of a plurality of multimedia services to any of a plurality of media devices of an end user; and
   a controller for managing operations of the plurality of service centers, wherein execution of computer instructions by the controller causes the controller to perform operations comprising:
   monitoring, for the plurality of media devices of the end user, use of multimedia services by way of interactions between the plurality of media devices and the service centers, wherein the use of the multimedia services comprises presentation by a previously selected one of the plurality of multimedia services to one of the plurality of media devices of the end user a first media content comprising video content and audio content that are associated with a subject matter portrayed in the first media content;
   detecting changes in use of the plurality of media devices by equipment of the end user over a pre-determined period of time;
   generating a category of a media type based on the changes; and
   providing a select one of the plurality of multimedia services adapted to the change in use based on the category of the media type, wherein the select one of the plurality of multimedia services comprises presentation of images at a first media device of the plurality of media devices of the end user, wherein the images graphically represent the subject matter portrayed in the first media content without presentation of the video content associated with the first media content, and wherein the select one of the plurality of multimedia services further comprises presentation of the subject matter portrayed in the audio content at a second media device of the plurality of media devices of the end user.

2. The multimedia services system of claim 1, wherein the operations further comprise selecting the select one of the plurality of multimedia services according to a feature selected from a group consisting of: a present location of the end user; a context of multimedia use by the equipment of the end user; a prior-use behavior of multimedia use by the equipment of the end user; a type of media device used by the equipment of the end user; multimedia preferences of the equipment of the end user; and combinations thereof.

3. The multimedia services system of claim 1, wherein the operations further comprise:
   adapting the select one of the plurality of multimedia services according to a prior context of use;
   initiating the select one of the plurality of multimedia services utilizing a first communication protocol;
   detecting a condition jeopardizing reliable communications regarding a communication session for the select one of the multimedia services; and
   continuing the communication session utilizing a second communication protocol.

4. The multimedia services system of claim 3, wherein the operations further comprise determining a last known use of the previously selected one of the plurality of multimedia services by the equipment of the end user; and commence presentation of the multimedia service according to the last known use.

5. The multimedia services system of claim 1, wherein the operations further comprise adapting the select one of the plurality of multimedia services to the first and second media devices selected by the equipment of the end user that differs from another media device of the plurality of media devices previously used during presentation of the first media content.

6. The multimedia services system of claim 1, wherein the operations further comprise detecting the change in use according to one selected from a group consisting of: a change in media devices of the end user; a change in location of the end user; a change in a context of use of multimedia services of the plurality of multimedia services; and combinations thereof.

7. The multimedia services system of claim 1, wherein the first media device of the plurality of media devices is a video system of a vehicle and the second media device of the plurality of media devices is an audio system of a vehicle, wherein the video system of the vehicle receives the images via streaming.

8. The multimedia services system of claim 1, wherein the operations further comprise:
offering the first media device of the plurality of media devices of the end user a multimedia service of the plurality of multimedia services adapted to the change in use; and
receiving from the first media device of the plurality of media devices, based on input obtained from equipment of the end user, an acceptance of the offering of the multimedia service of the plurality of multimedia services.

9. The multimedia services system of claim 1, wherein the service centers are coupled to a selectable media device of the end user that intercepts multimedia services of the plurality of multimedia services from the service centers and exchanges end user messages therewith, and wherein the exchanges conform to a protocol selected from a group consisting of: a circuit-switched protocol; and a packet-switched protocol.

10. The multimedia services system of claim 1, wherein the operations further comprise:
detecting the change in use according to a transition between media devices of the plurality of media devices of the end user selectable by the equipment of the end user, wherein the media devices of the plurality of media devices comprise a plurality of devices selected from a group consisting of: a television medium; a telematics system; a computing device; a communications device; and a gaming device; and
adapting the select one of the plurality of multimedia services according to the change in media devices.

11. A non-transitory computer-readable storage medium, comprising computer instructions which when executed by a processor cause the processor to perform operations comprising:
monitoring use by equipment of an end user of multimedia services of a plurality of multimedia services by way of interactions between a plurality of media devices of the end user and a plurality of service centers, wherein the use of the multimedia services comprises presentation by a previously selected one of the plurality of multimedia services, to one of the plurality of media devices of the end user, a first multimedia content comprising video content and audio content that are associated with a subject matter portrayed in the multimedia content;
detecting changes in the use of the plurality of media devices by the equipment of the end user over a predetermined period of time;
generating a category of a media type based on the changes;
selecting a select one of the plurality of multimedia services from a select one of the service centers adapted to the change in use based on the category of the media type, wherein the select one of the plurality of multimedia services includes delivery of the multimedia content; and
causing the service centers to offer first and second media devices of the plurality of media devices of the end user a partitioned version of the multimedia content, wherein the partitioned version delivers a first content portion associated with the subject matter portrayed in the multimedia content to the first media device and delivers a second content portion associated with the subject matter portrayed in the multimedia content to the second media device, wherein the multimedia content is associated with video content and audio content, wherein the first content portion comprises images graphically representing the subject matter portrayed in the video content without presentation of the video content, and wherein the second content portion comprises audio representing the subject matter portrayed in the audio content.

12. The non-transitory computer-readable storage medium of claim 11, wherein the images graphically depict positions of objects portrayed in the video content.

13. The non-transitory computer-readable storage medium of claim 11, wherein the second content portion comprises other audio content without presentation of the audio content of the multimedia content.

14. The non-transitory computer-readable storage medium of claim 11, wherein the operations further comprise:
adapting the select one of the plurality of multimedia services to the first and second media devices selected by equipment of the end user that differ from another media device previously used by the end user; and
commencing presentation of the first and second content portions according to a last known use of the previously selected one of the plurality of multimedia services by the equipment of the end user, wherein the partitioned version of the multimedia service previously selected includes removing a portion of the subject matter portrayed in the multimedia content from delivery based on a usage history associated with the end user.

15. The non-transitory computer-readable storage medium of claim 11, wherein the first media device is a video system of a vehicle, wherein the video system receives the first content portion via streaming, and wherein the second media device is a mobile device capable of voice communications.

16. The non-transitory computer-readable storage medium of claim 11, wherein the first media device is a video system of a vehicle, wherein the video system receives the first content portion via streaming.

17. The non-transitory computer-readable storage medium of claim 16, wherein the second media device is an audio system of the vehicle.

18. A method, comprising:
monitoring, by a system comprising a processor, use of a multimedia service of a plurality of multimedia services by way of interaction between a plurality of media devices of an end user and a plurality of service centers offering the plurality of multimedia services, wherein the use of the multimedia service comprises presentation by a previously selected one of the plurality of multimedia services to one of the plurality of media devices of the end user selectable by equipment of the end user, a first media content comprising video content and audio content that are associated with a subject matter portrayed in the first media content;

detecting, by the system, changes in use of the plurality of media devices of the end user over a pre-determined period of time;

generating, by the system, a category of a media type based on the changes; and providing, by the system, to a first media device and a second media device of the plurality of media devices of the end user a select one of the plurality of multimedia services adapted to the change in use based on the category of the media type, wherein the select one of the plurality of multimedia services comprises presentation of images graphically representing subject matter portrayed in the first media content without presentation of the video content at the first media device and presentation of the subject matter portrayed the audio content at the second media device.

19. The method of claim 18, wherein the first media device is a video system of a vehicle, wherein the video system receives the video content associated with the first media content via streaming.

20. The method of claim 19, wherein the multimedia service adapted to the change in use is adapted to the first and second media devices that differ from a media device previously used by the equipment of the end user, wherein the second media device is a mobile device capable of voice communications.

21. The method of claim 18, comprising:

receiving, by the system, from a media device of the plurality of media devices selectable by the equipment of the end user an acceptance of the multimedia service adapted to the change in use;

presenting, by the system, the multimedia service adapted to the change in use to a media device of the plurality of media devices selectable by the equipment of the end user in response to the receiving of the acceptance; and receiving, by the system, an offer for another multimedia service adapted to the change in use in response to not receiving the acceptance.

22. The method of claim 18, comprising:

detecting the change in use according to a transition between the media device of the plurality of media devices selectable by the equipment of the end user; and adapting the multimedia service according to the transition.

* * * * *